A. B. KNIGHT.
MACHINE FOR SCORING, CRACKING OFF, AND GLAZING ELECTRIC BULBS, OR OTHER ARTICLES OF GLASSWARE.
APPLICATION FILED NOV. 28, 1916.

1,251,541.

Patented Jan. 1, 1918.
4 SHEETS—SHEET 1.

Inventor
A. B. Knight,
By C. L. Parker
Attorney

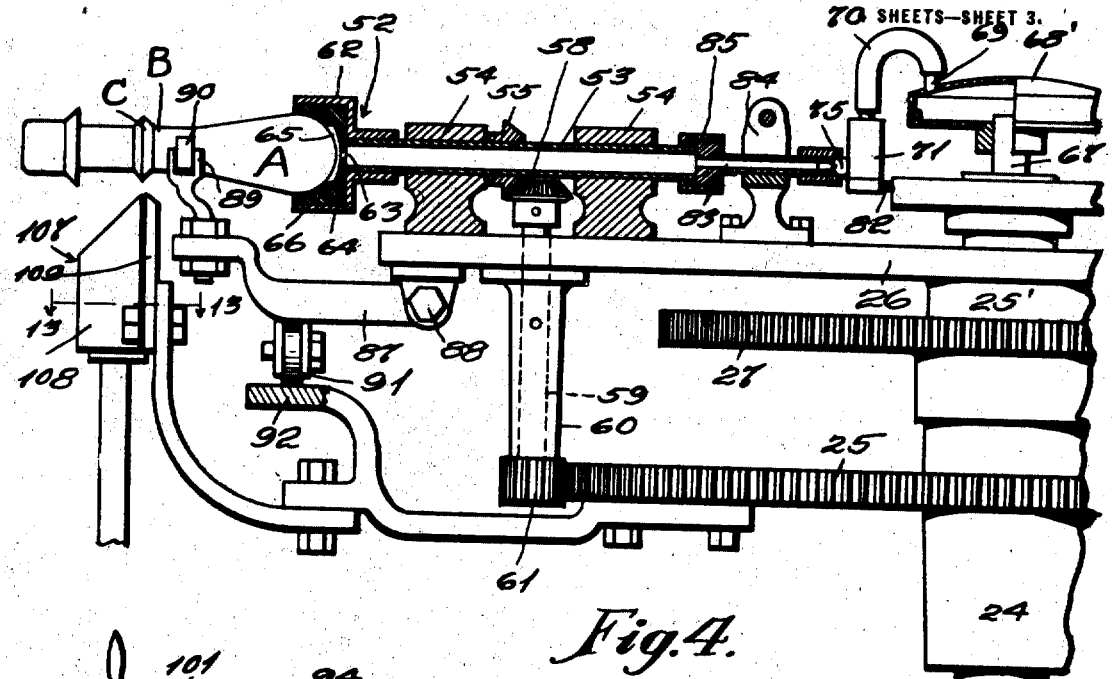

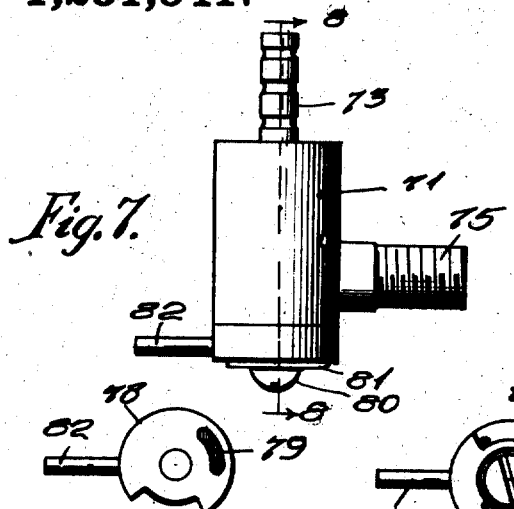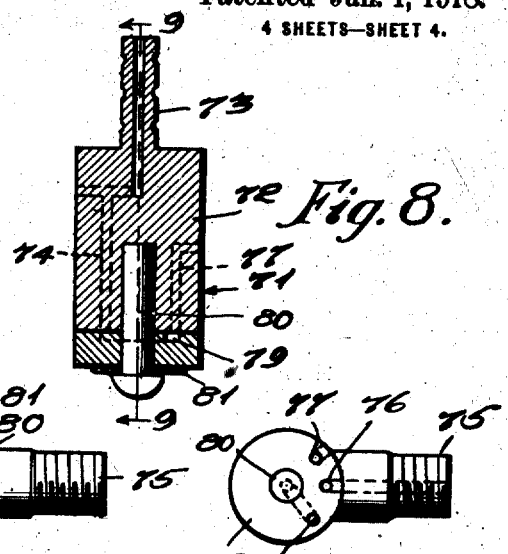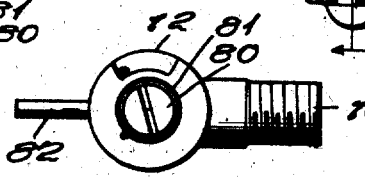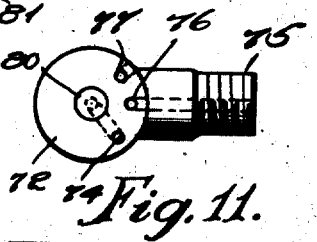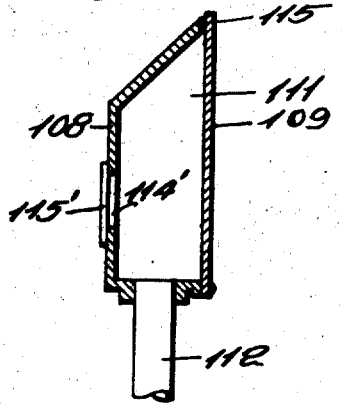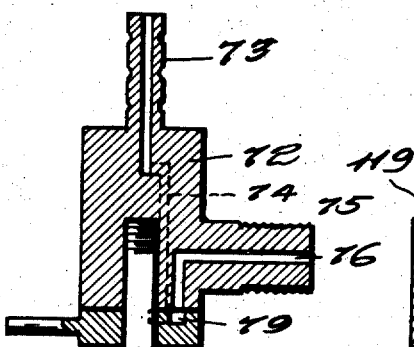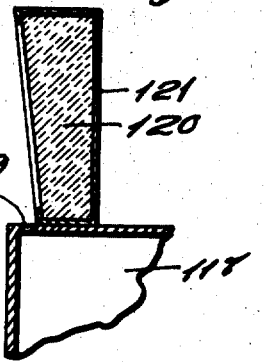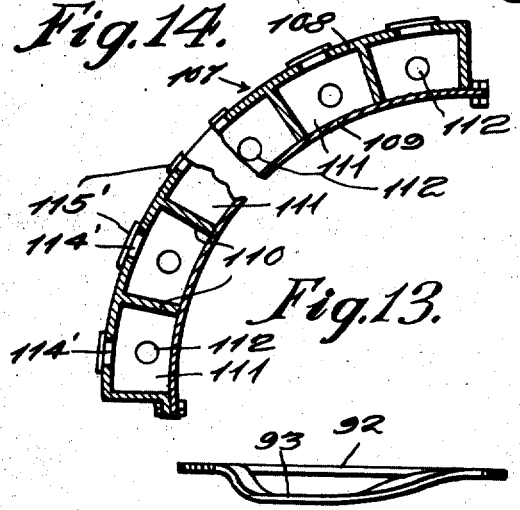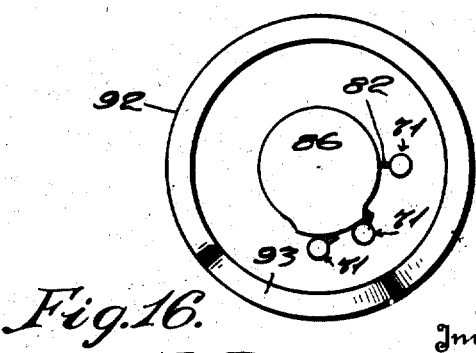

UNITED STATES PATENT OFFICE.

ALBERT B. KNIGHT, OF TOLEDO, OHIO.

MACHINE FOR SCORING, CRACKING OFF, AND GLAZING ELECTRIC BULBS OR OTHER ARTICLES OF GLASSWARE.

1,251,541.  Specification of Letters Patent.  Patented Jan. 1, 1918.

Application filed November 28, 1916. Serial No. 133,939.

*To all whom it may concern:*

Be it known that I, ALBERT B. KNIGHT, a citizen of the United States, residing at Toledo, in the county of Lucas and State of Ohio, have invented certain new and useful Improvements in Machines for Scoring, Cracking Off, and Glazing Electric Bulbs or other Articles of Glassware, of which the following is a specification.

My invention relates to a machine for scoring, cracking off, and melting or glazing the ends or the necks of electric bulbs or other articles of glass ware.

As is well known, the manufacturers of electric lamps ordinarily purchase the bulbs from glass manufacturers. These bulbs as furnished by the manufacturers ordinarily have long necks with an annular bulging rib or flange. The electric lamp manufacturer is called upon to cut the necks off, at the bulging flange. This cutting of the necks of the bulbs is time consuming and objectionable to manufacturers of electric lamps. As far as I am aware, heretofore no attempt has been made to cut or crack off the necks of the bulbs and glaze the same, and furnish the bulbs in this finished condition to the manufacturer of electric lamps.

An important object of the invention is to provide a machine which will crack or cut off the necks of the bulbs and subsequently glaze the cut edge, providing a smooth edge of increased strength, which will not damage the filament or other parts, when they are passed through the neck of the bulb.

A further object of the invention is to provide a machine of the above mentioned character, which is capable of a large output, whereby the cost of manufacture of the bulbs will not be materially advanced.

Other objects and advantages of the invention will be apparent during the course of the following description.

In the accompanying drawings forming a part of this specification and in which like numerals are employed to designate like parts throughout the same.

Figure 1:
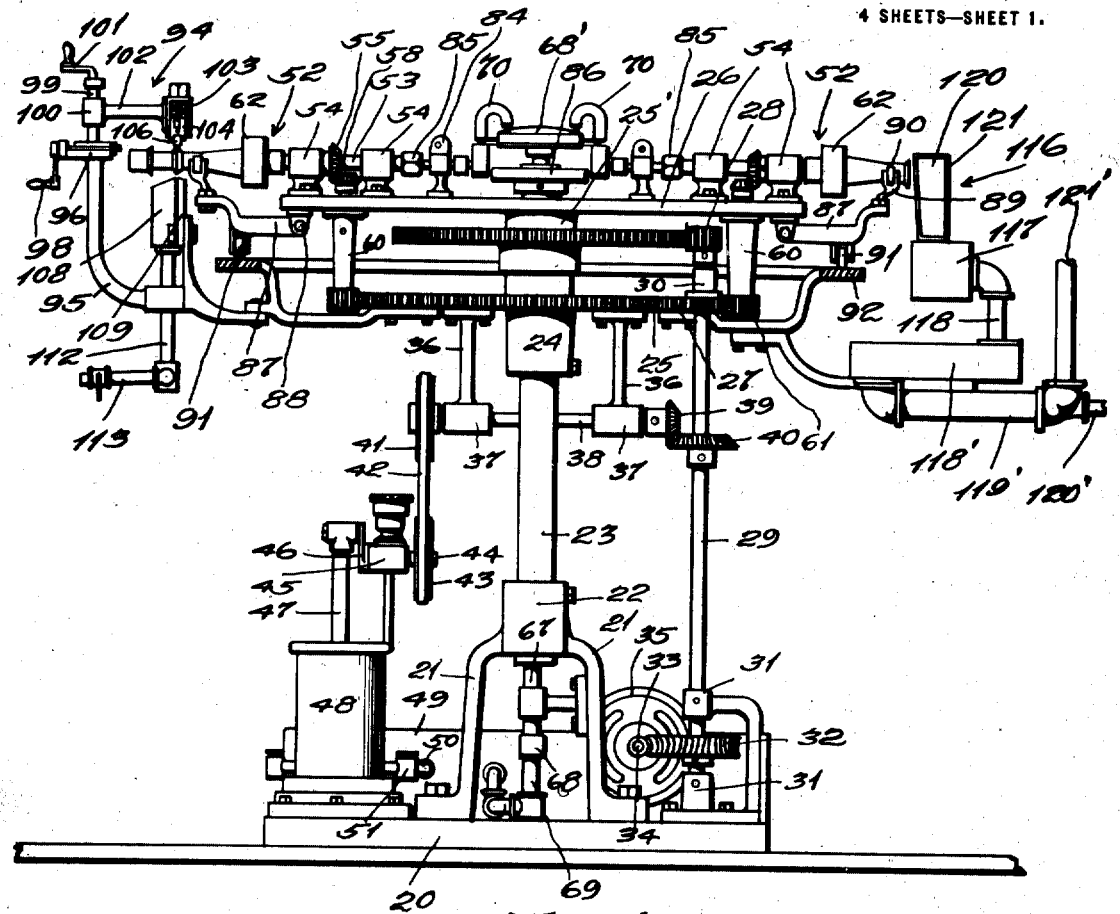
Figure 1 is a side elevation of a machine embodying my invention.
Figure 2:
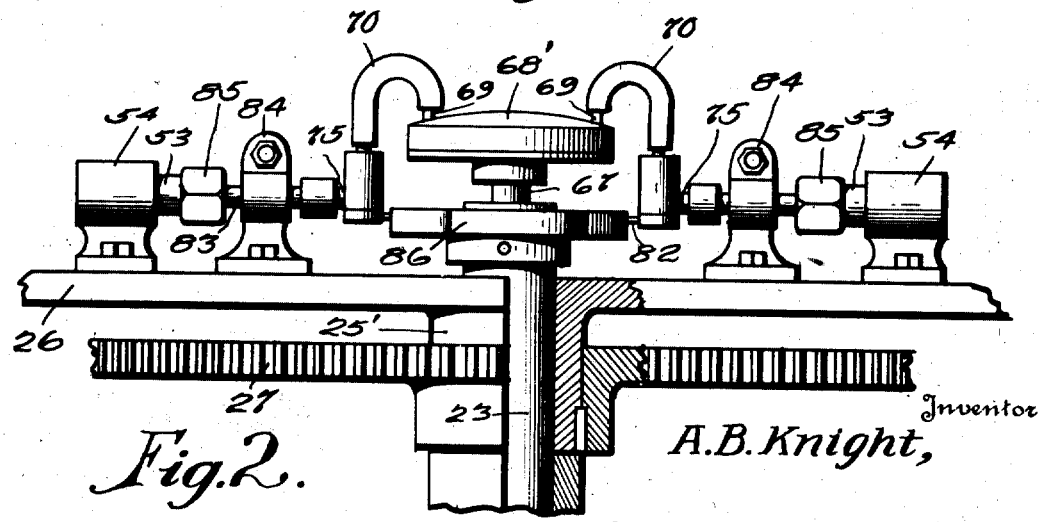
Fig. 2 is an enlarged side elevation of an operating cam, valves and associated elements.
Figure 3:
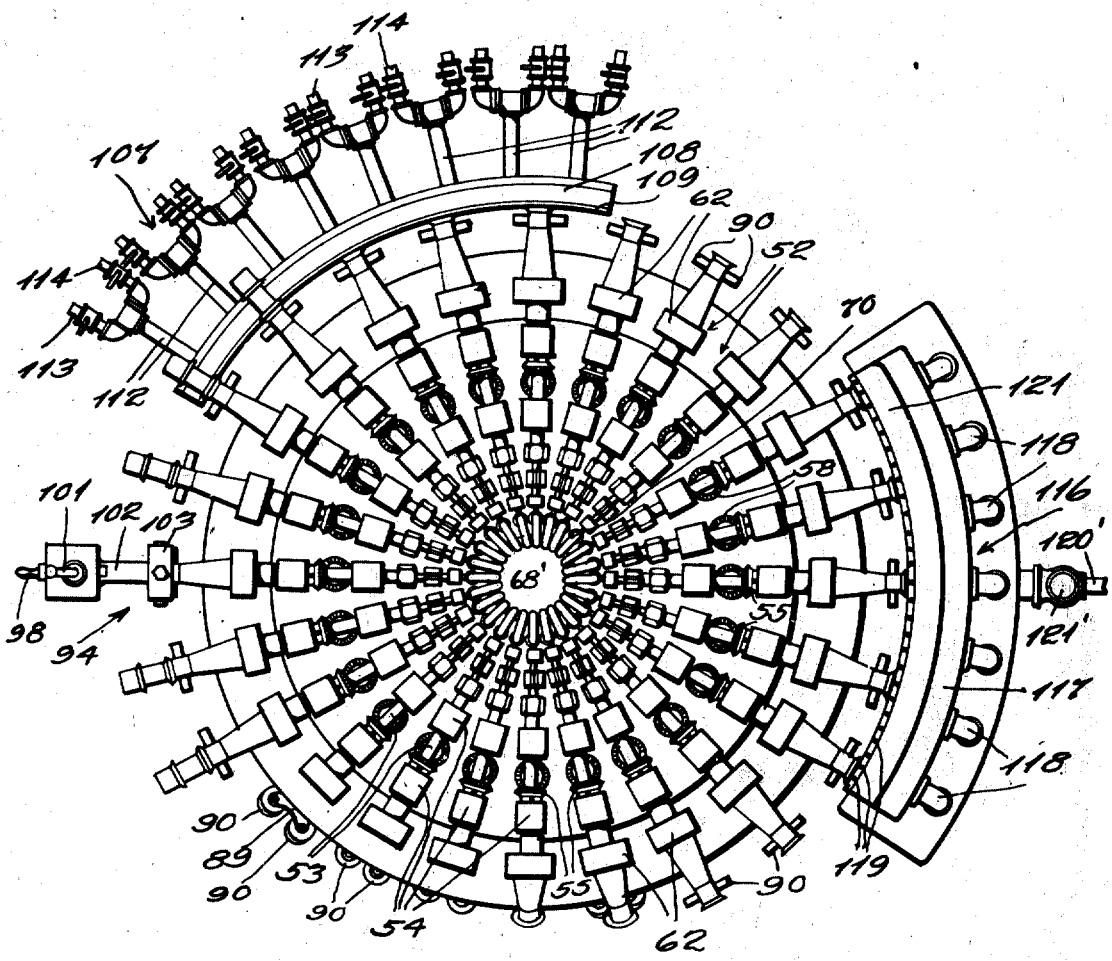
Fig. 3 is a plan view of the machine.

Fig. 4 is an enlarged detail longitudinal section through one of the bulb holding and turning devices, associated elements being shown in elevation, Fig. 5 is a side elevation of the scoring mechanism, Fig. 6 is an elevation taken at a right angle to Fig. 5 of means for adjusting the scoring mechanism, Fig. 7 is a side elevation of a valve, Fig. 8 is a longitudinal sectional view through the same, taken on line 8—8 of Fig. 7, Fig. 9 is a similar view taken on line 9—9 of Fig. 8, Fig. 10 is a bottom plan view of the valve, Fig. 11 is a similar view of the valve casing with the pivoted valve removed, Fig. 12 is a plan view of the pivoted valve, Fig. 13 is a horizontal sectional view taken through the cracking burner on line 13—13 of Fig. 4, Fig. 14 is a transverse sectional view through the same, Fig. 15 is a transverse sectional view through the glazing burner.

Fig. 16 is a plan view of a cam, track and burners, the same being shown partly diagrammatically, and, Fig. 17 is a side elevation of the track.

In the drawings, wherein for the purpose of illustration is shown a preferred embodiment of my invention, the numeral 20 designates a base, upon which is rigidly mounted standards 21, carrying a sleeve 22. A tubular standard 23 is rigidly mounted in the sleeve 22, and is preferably vertically arranged.

Rigidly connected with the upper portion of the tubular standard 23 is a sleeve or hub 24, of a stationary support or gear 25. Rotatably mounted upon the upper portion of the tubular standard 23, above the hub 24, and preferably slidably contacting therewith, is a hub or sleeve 25' of a rotatable table or support 26. The hub 25' has a driving gear 27 rigidly mounted thereon which serves to turn the table 26. The gear 27 receives its rotation from a smaller gear 28, rigidly mounted upon the upper end of a vertical driving shaft 29.

The driving shaft 29 is journaled through bearings 30 and 31 and a worm wheel 32 is rigidly secured to the lower end of the shaft.

This worm wheel engages and is driven by a worm 33 formed upon the armature shaft 34 of a motor 35.

Rigidly connected with the gear or support 25 and depending therefrom are hangers 36, carrying at their lower ends bearings 37, receiving a transverse horizontal drive shaft 38. This drive shaft 38 is provided at one end with a bevel gear 39, rigidly secured thereto, and this bevel gear engages a bevel gear 40 rigidly secured to the shaft 29. To the opposite end of the shaft 38 is rigidly secured a pulley 41, engaged by a belt 42, engaging a pulley 43. The pulley 43 drives a shaft 44, journaled through a stationary bearing 45. The shaft 44 operates a crank 46, which in turn drives the pitmen 47 of a vacuum pump 48. This vacuum pump is connected with a vacuum storage tank 49 through the medium of a suitable conduit 50 having a check valve 51 therein and serves to create a suitable degree of vacuum within the tank 49.

The machine further comprises a plurality of electric bulb holding devices, designated as a whole by the numeral 52. As more clearly shown in Fig. 4, each of these devices comprises a tubular spindle 43, horizontally arranged and journaled in bearings 54, which are rigidly secured to the upper surface of the table 26. The tubular spindle 53 is free to rotate but does not partake of perceptible longitudinal movement. Each spindle 53 receives its rotation from a bevel gear 55 rigidly mounted thereon, and this bevel gear is driven by a bevel gear 58, rigidly mounted upon the vertical shaft 59. The vertical shaft 59 is journaled through a bearing 60 arranged beneath and rigidly secured to the table 26. The shaft 59 has a gear 61 rigidly secured to its lower end and this gear engages the stationary gear 25. From the description thus far given it is apparent that as the table 26 rotates, the shafts 59 rotate with it, and these shafts 59 are simultaneously made to turn upon their axes, by virtue of the gears 61 traveling about the stationary gear 25.

Each bulb holding device further comprises a suction cup 62, rigidly attached to the outer end of the tubular spindle 53. The cup 62 has a central opening 63 in communication with the bore of the tubular spindle 53. The opening 63 communicates with an opening 64 which leads to the recess 65 of a cushion 66 which is preferably formed of rubber and arranged within the cup 62. It might be stated at this point that when a vacuum is created within the spindle 53 and the large end of a bulb inserted within the recess 65, such bulb will be securely held therein.

Means are provided to create a vacuum within the tubular spindle 53, comprising a rotatable vacuum pipe 67, extending through the tubular standard 23. The lower end of the rotatable pipe 67 has an air tight swiveled connection 68 with a stationary pipe 69' leading to the interior of the vacuum storage tank 49. The rotatable vacuum pipe 67 extends upwardly and projects beyond the upper end of the stationary tubular standard 23 and has a distributing drum or shell 68' rigidly mounted thereon. Connected with the top portion of the distributing drum 68' are short pipes or nipples 69, engaged by preferably flexible pipes or hose 70, arranged as shown. The number of pipes 70 correspond to the number of bulb holding devices and each pipe 70 is connected with a valve structure 71. This valve structure comprises a casing or body portion 72 having a tubular nipple 73, extending into the pipe 70. The port of the tubular nipple 73 communicates with a main port 74 formed through the body portion 72 and this main port passes through the bottom surface of the body portion. Connected with the body portion 72 is a tubular nipple 75, having its bore in communication with a port 76, also passing through the bottom of the body portion 72. The numeral 77 designates an exhaust port, the upper end of which leads to the atmosphere and the lower end of which passes through the bottom of the body portion 72. The numeral 78 designates a pivoted valve, provided with a segmental surface groove 79, upon its upper surface. When this valve is in the normal position, the segmental groove 79 serves to establish communication between the main port 74 and the port 76, and when the valve 78 is turned clockwise the segmental groove connects the port 76 and the exhaust port 77, while the main port is closed. The valve 78 is pivoted upon a pin 80, and is held in the normal position by means of a spring 81, which is attached to the valve and to the head of the pin 80. Rigidly connected with the valve 78 is a pin 82, which serves to shift the valve in a manner to be hereinafter described. The nipple 75 has connection with a stationary coupling 83, held in a clamp 84 rigidly mounted upon the table 26. The coupling 83 has an air tight swiveled connection with the tubular spindle 53, as shown at 85. The cranks or pins 82 carried by the pivoted valves 78 are arranged to contact with a stationary cam 86, rigidly mounted upon the upper end of the tubular standard 23, as shown.

Arranged beneath each bulb holding device is a vertically swinging support or arm 87, pivoted to the lower portion of the table 26, as shown at 88. Secured to the outer end of the support or arm 87 is a forked upstanding member 89, carrying rollers 90 adapted to receive the neck of the bulb therebetween and to support the outer portion of the bulb. Pivotally connected with each support or arm 87 between its ends is a roller 91 arranged therebelow and traveling in contact with a stationary annular track 92. The track has an upper horizontal portion and a forward depressed portion 93, as shown.

The numeral 94 designates scoring mechanism as a whole, comprising an arm or bracket 95 which is attached to the track 92 to be supported thereby. Formed upon the upper end of the bracket 95 is a guide 96 having a horizontally sliding carriage 97 mounted therein which is shifted by means of a hand crank 98. The carriage 97 carries an upstanding post 99 upon which is vertically movably mounted a tubular slide 100, raised and lowered by rotating a crank 101. Formed integral with the slide 100 is a horizontal arm 102 to the outer end of which is secured a head 103. This head receives a vertically movable block 104 mounted to slide therein and forced downwardly by means of a spring 105. The block 104 carries a scoring block 106, preferably formed of emery and having a flat cutting face, as shown. It is thus apparent that the head 103 may be vertically or horizontally adjusted to bring the cutting member 106 in proper contact with the work, as may be found advantageous. This scoring mechanism is arranged near and slightly rearwardly of the elevating end of the depressed portion 94 of the track.

Arranged rearwardly of the scoring mechanism is a cracking off burner 107 comprising a longitudinally curved burner conduit 108, the inner face of which is closed by a plate 109. This burner conduit is divided by transverse partitions 110 into a plurality of chambers 111, and a pipe 112 leads into the bottom of each burner chamber. Each pipe 112 has connection with pipes 113 and 114 for supplying a suitable mixture of air and gas thereto. Each burner chamber has an upwardly discharging opening 115 adapted to provide an upwardly discharging flame, which is arranged to heat the scored portion of the bulb, causing it to crack off. Formed in the outer side of each burner chamber is a port 114', for the passage of a match, and this port is normally covered by a side 115'.

Arranged near the lowering end of the depressed portion 93 of the track is a melting or glazing burner 116, comprising a longitudinally curved burner conduit 117, receiving a suitable mixture of air and gas from pipes 118. These pipes lead into a mixing chamber 118', connected with a pipe 119'. Gas and air supply pipes 120' and 121' lead into the pipe 119', as shown. As more clearly shown in Fig. 15, the burner conduit 117 is provided at its top with upwardly discharging apertures 119, providing upwardly discharging flames, adapted to contact with a clay surface 120 held in a housing 121. The flames are accordingly deflected or retained in proximity to the cut edges of the bulbs and such edges are accordingly glazed or melted, providing a round smooth edge.

The operation of the apparatus is as follows:

When the motor 35 is started, it drives the shaft 29 at a suitably reduced speed in the direction of its arrow. The shaft 29 drives the shaft 38, which operates the vacuum pump 48, creating and maintaining a suitable degree of vacuum within the tank 49. The shaft 29 turns the gear 27 and the table 26, so that the forward portion of the table travels from right to left. During this continuous rotation of the table 26, the rollers 91 travel upon the track 92, and as each arm 87 reaches the lowering end of the depression or depressed portion 93 in the track, the arm 87 automatically gravitates to a lower or inclined position. When the arm approaches the elevating end of the depressed portion of the track such arm is swung upwardly to the horizontal position. As each arm 87 is returned to the upper horizontal position the operator inserts the large end of a bulb A into the recess 65, and the neck B of this bulb is held between the rollers 90. A vacuum is now maintained in the spindle 53, whereby the bulb A will be securely held within the recess 65. The pin or crank 82 of the corresponding valve structure connected with this holding device now engages the reduced portion of the cam 86, whereby the groove 78 establishes communication between ports 74 and 76. Upon the continued turning of the table 26, and a little before the lowering of the arm 87, as hereinabove explained, the pin 82 is brought into contact with the enlarged portion of the cam, whereby the port 74 is placed in communication with the exhaust port 77 and the port 76 is closed. The vacuum is therefore broken in the recess 65 (but is renewed when the arm 87 is returned to the horizontal position) and when the arm 87 descends, the bulb A will slide from the recess and fall upon or be caught by an endless conveyer (not shown), and be conducted to a desired station. During the travel of the bulb A, while the same remains horizontal, it is first brought into proximity to the scoring member 106, and while passing therebeneath is rotated upon its longitudinal axis. This serves to score the annular flange or outwardly bulging portion C, as it contacts with the scoring member. The further movement of the bulb A brings the scored annular portion C above and in proximity to the flame of the burner 107, whereby this scored portion is heated and cracks off. The bulb continues upon its travel and is brought in proximity to the burner 116, and its scored end is subjected to the action of heat from this burner, whereby such end is glazed or melted. The end thus treated is found to be strengthened, smooth and round. After this final treatment the bulb is discharged from the machine, by the lowering of the arm 87, as above stated.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:—

1. In apparatus of the character described, the combination with a pivoted support; a holding device carried by the pivoted support and adapted to receive one end of an article of glass-ware; means to render the holding device active and inactive; a movable support-member connected with the pivoted support and adapted to engage the lower side of the article of glass-ware at a point a suitable distance from the holding device to prevent the article of glass-ware from moving downwardly; a scoring device arranged to contact with the upper side of the article of glass-ware and to force the same downwardly in opposition to the movable support-member; and means for retaining the movable support-member in the upper active position when the scoring device is contacting with the article of glass-ware and to allow the support-member to move downwardly after such action.

2. In apparatus of the character described, the combination with a rotatable substantially horizontal table; of a tubular spindle connected with the table for rotation therewith and being rotatable upon its longitudinal axis; means to rotate the tubular spindle upon its longitudinal axis; a suction cup carried by the outer portion of the tubular spindle; a vertically swinging arm pivotally connected with the table beneath the suction cup and adapted to engage the lower side of the article of glass-ware held in the suction cup at a point spaced from the suction cup to prevent downward movement of the article of glass-ware; a scoring device disposed to contact with the upper side of the article of glass-ware and to force the same downwardly in opposition to the vertically swinging arm; means including a track having an elevated portion for retaining the vertically swinging arm in the upper position when the scoring device is acting upon the article of glass-ware and a depressed portion for causing the arm to move downwardly after such action; means for creating a suitable degree of vacuum within the tubular spindle and to break such vacuum at a suitable time; and means to rotate the table.

3. In a machine of the character described, the combination with a support; of a rotatable table connected with the support; a tubular spindle connected with the table for rotation therewith and being rotatable upon its longitudinal axis and held against substantial longitudinal movement with respect to the table; a suction cup carried by the outer portion of the spindle for the reception of an article of glass-ware; a rotatable vacuum shell arranged near the inner end of the tubular spindle; a conduit connecting the rotatable vacuum shell with the tubular spindle; a valve connected in the conduit and having a crank; a relatively stationary cam arranged to contact with the crank to open and close the valve in proper timed order; a vertically swinging lever pivoted to the table beneath the tubular spindle; anti friction means carried by the outer end of the lever to contact with the article of glass-ware; a track arranged near and beneath the pivoted lever for controlling its vertical movement and having raised and depressed portions; an article of glass-ware treating means arranged in proximity to the path of travel of the article; means to rotate the table; and means to rotate the spindle upon its longitudinal axis.

4. In a machine of the class described, means for releasably holding a work piece and revolving the same about a vertical axis and rotating it about a reclining axis, means for acting on the work piece at a predetermined point in a revolution thereof to annularly scratch its surface, and means for supporting a part of the work piece in opposition to said scratching means and automatically movable into and out of work supporting position at predetermined points in a revolution of said holding means, and separate heating means for heating the work piece to crack off the same and for glazing the end thereof.

In testimony whereof I affix my signature in presence of two witnesses.

ALBERT B. KNIGHT.

Witnesses:
C. L. PARKER,
JAMES L. CRAWFORD.